United States Patent [19]

Misaka

[11] Patent Number: 5,050,076
[45] Date of Patent: Sep. 17, 1991

[54] PREFETCHING QUEUE CONTROL SYSTEM

[75] Inventor: Toshio Misaka, Tokyo, Japan

[73] Assignee: NEC Corporation, Tokyo, Japan

[21] Appl. No.: 252,927

[22] Filed: Oct. 4, 1988

[30] Foreign Application Priority Data

Oct. 5, 1987 [JP] Japan .............................. 62-249975

[51] Int. Cl.[5] .......................... G06F 9/30; G06F 9/38
[52] U.S. Cl. ................................. 364/200; 364/263.1;
364/254.5; 364/262.4; 364/261.3; 364/261.7
[58] Field of Search ... 364/200 MS File, 900 MS File

[56] References Cited

U.S. PATENT DOCUMENTS

| 4,200,927 | 4/1980 | Hughes et al. | 364/200 |
| 4,318,174 | 3/1982 | Suzuki et al. | 364/200 |
| 4,373,180 | 2/1983 | Linde | 364/200 |
| 4,471,433 | 9/1984 | Matsumoto et al. | 364/200 |
| 4,566,063 | 1/1986 | Zolnowsky et al. | 364/200 |
| 4,594,659 | 6/1986 | Guenthner et al. | 364/200 |
| 4,604,691 | 8/1986 | Akagi | 364/200 |

Primary Examiner—Eddie P. Chan
Attorney, Agent, or Firm—Foley & Lardner

[57] ABSTRACT

In a computer in which an instruction is prefetched in a buffer, a prefetching queue control system includes a memory for prestoring an instruction sequence which is to be executed for a time interval before an instruction at a destination of a branch is supplied when branching occurs, and a controller for transferring the instruction sequence to the buffer and executing the transferred instruction sequence until the instruction at the destination of the branch is supplied.

2 Claims, 4 Drawing Sheets

1

PREFETCHING QUEUE CONTROL SYSTEM

BACKGROUND OF THE INVENTION

The present invention relates to a prefetching queue control system for controlling a buffer or a prefetching queue for storing prefetched instructions in a computer in which, in parallel to the execution of one instruction, a subsequent instruction is stored in the buffer prior to the execution thereof, i.e., so-called prefetching is performed.

Recently, computers increasingly are using a prefetching function in order to increase their processing speed. For purposes of easier control, most of the conventional computers using a prefetching function are being controlled so that when branching occurs because of a branch instruction or an interruption, a prefetching queue is temporarily emptied, i.e., prefetched instructions are rendered invalid. Therefore, the execution of an instruction by a computer is stopped until an instruction at a branch destination is read out and is stored in the prefetching queue.

As described above, in conventional computers, vacant time in which execution of an instruction is temporarily stopped is caused when branching occurs. Since the frequency of occurrence of branching is high in most programs, the total vacant time is inevitably increased.

SUMMARY OF THE INVENTION

It is an object of the present invention to solve such a conventional problem and provide a prefetching queue control system for eliminating vacant time in which the execution of instructions is temporarily stopped when branching occurs in a computer having a prefetching queue.

According to the present invention, there is provided a prefetching queue control system in a computer having a prefetching function in which in parallel to execution of a current instruction, a subsequent instruction is read out from a main memory to the buffer, comprising: a first storage unit, provided independently of the buffer, for storing an instruction sequence having a length equal to at most the length of said buffer, a write unit for writing an instruction sequence in the first storage unit, a second storage unit for storing the length of the instruction sequence, and a transfer unit for transferring the instruction sequence stored in the first storage unit to the buffer when branching occurs.

DETAILED DESCRIPTION OF THE PREFERRED EMBODIMENT

An embodiment of the present invention will be described in detail below with reference to the accompanying drawings.

Figure 1:
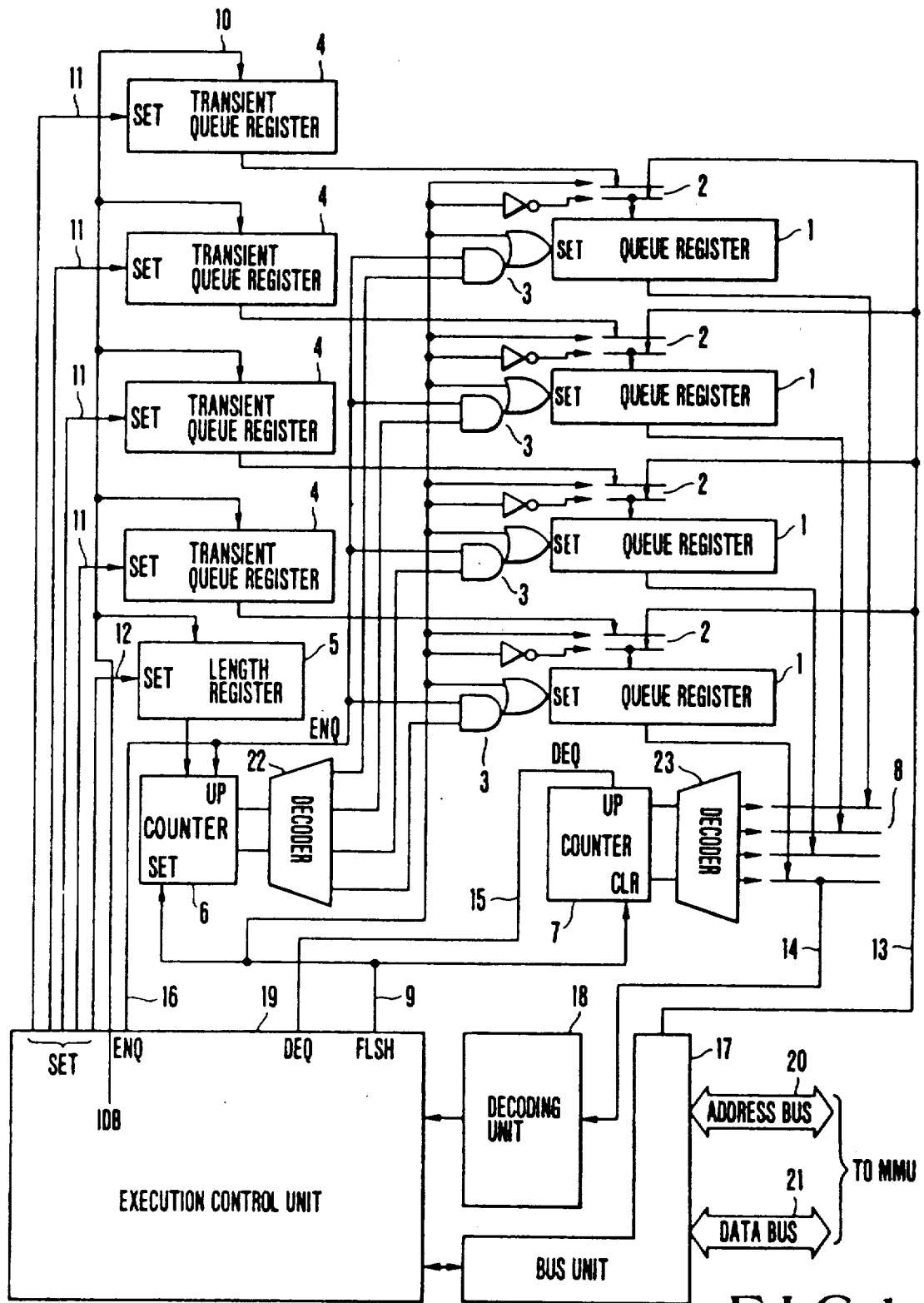
FIG. 1 is a block diagram showing a prefetching queue control system according to an embodiment of the present invention.

FIG. 1 shows a prefetching queue control system according to the embodiment of the present invention.

Referring to FIG. 1, a plurality of queue registers 1 (FIG. 1 shows four registers as an example), each of which stores one instruction word, constitute a prefetching queue or a buffer memory. Each queue register 1 stores an output from a selector 2 when a signal "1" is input to its terminal SET. The terminals SET of the queue registers 1 are respectively connected to the output terminals of OR gates of gate circuits 3. One input terminal of each OR gate is connected to the output terminal of a corresponding AND gate. The other input terminal of each OR gate is connected to the terminal FLSH of an execution control unit 19 through a line 9. One input terminal of the AND gate of each gate circuit 3 is commonly connected to the terminal ENQ of the execution control unit 19 through a line 16. The other input terminal of each AND gate is connected to a corresponding output terminal of a decoder 22 for decoding a count value of a counter 6.

The terminals UP and SET of the counter 6 are respectively connected to the terminal ENQ of the execution control unit 19 through the line 16 and to the line 9. In addition, the counter 6 is connected to a length register 5, which will be described later. When a signal "1" is input to the terminal SET of the counter 6, its contents are replaced with that of the length register 5. The count value of the counter 6 is decoded by the decoder 22 and is used as an element for providing a signal SET for the queue registers 1.

In the above-described arrangement, the queue register 1 can store an output from a corresponding selector 2 when a signal ENQ supplied from the execution control unit 19 through the line 16 and representing that a valid instruction has been reached is set at logic "1", and at the same time, the count value of the counter 6 designates the same queue register 1, or when a signal FLSH which is output from the execution control unit 19 through the line 9 is set at logic "1".

The output terminals of the queue registers 1 are respectively connected to the input terminals of a selector 8. The selector 8 selects one of the input terminals in accordance with an output signal from a decoder 23 for decoding the count value of a counter 7, and outputs the contents of the queue register 1 connected to the selected input terminal to a decoding unit 18 through an instruction bus 14. The decoding unit 18 decodes an instruction supplied through the instruction bus 14, and supplies the decoded instruction to the execution control unit 19.

The counter 7 is incremented by a signal DEQ supplied from the terminal DEQ of the execution control unit 19 to its terminal UP through a line 15, and is cleared when a signal FLSH which is supplied to its terminal CLR through the line 9 is set at logic "1". The count value of the counter 7 is decoded by the decoder 23 so as to designate one of the inputs to the selector 8 which is to be decoded by the decoding unit 18.

One input terminal of each selector 2 is connected to a bus unit 17, which is connected to a memory (not shown) through address and data buses 20 and 21, through a common prefetching bus 13, and receives an instruction prefetched from the memory through the prefetching bus 13.

The other input terminal of each selector 2 is connected to the output terminal of a corresponding one of transient queue registers 4, which will be described later, in one-to-one correspondence. The number of transient queue registers 4 is equal to the number of the queue registers 1 at most (FIG. 1 shows the same number thereof, i.e., four). Each selector 2 selects an input from a corresponding transient queue register 4 or an input through the prefetching bus 13 depending on whether the signal FLSH output from the execution control unit 19 is set at logic "1" or logic "0".

The plurality (four) of transient queue registers 4 constitute a transient buffer which can store an instruction sequence of a length equal to the length of the prefetching queue at most. The input terminals of the respective transient queue registers 4 are connected to an internal data bus IDB of the execution control unit 19 through a common line 10. The terminals SET of the transient queue registers 4 are respectively connected to the terminals SET of the execution control unit 19 through different lines 11. Each transient queue register 4 stores data supplied through the line 10 when a signal "1" is input to its terminal SET.

The input terminal of the length register 5 is connected to the internal data bus IDB of the execution control unit 19 through the line 10 together with the input terminals of the respective transient queue registers 4. The terminal SET of the length register 5 is connected to one of the terminals SET of the execution control unit 19. The output terminal of the length register 5 is connected to the input terminal of the counter 6.

Note that the transient queue registers 4, the length register 5, and the selectors 2 are not employed in the prior art, and hence constitute the characteristic feature of the present invention.

An operation of the system shown in FIG. 1 will be described below.

When a valid instruction arrives from the memory (not shown) through the data bus 21, the bus unit 17 supplies the instruction to the prefetching queue consisting of the plurality of queue registers 1 through the prefetching bus 13, and at the same time, provides signals to the execution control unit 19. The execution control unit 19 sets the signal ENQ, which is output through the line 16, at logic "1". With this operation, the prefetched instruction is set in one of the queue registers 1, which is designated by the current count value of the counter 6, and at the same time, the counter 6 is incremented. That is, the counter 6 stores data representing which queue register 1 will store an instruction in response to the next signal ENQ.

When the execution control unit 19 is in a state wherein it can execute the instruction, the contents of the queue register 1 designated by the count value of the counter 7 are read out by the decoding unit 18 through the selector 8. The decoding unit 18 starts decoding of the contents readout and the signal DEQ is set at logic "1". With this operation, the counter 7 is incremented. That is, the counter 7 stores data representing one of the queue registers 1, from which contents are to be read out and decoded in the next cycle.

When branching occurs during the execution of the instruction, the FLSH signal 9 is set at logic "1", the value of the length register 5 is set in the counter 6, and the counter 7 is cleared. The execution control unit 19 outputs the address of a destination of the branch to the memory through the bus unit 17. However, a considerably long period of time is required for an instruction at the destination of the branch to arrive from the memory.

As described above, in the prior art, the execution control unit 19 and the decoding unit 18 are kept in an inactive state during this period.

According to the system of the present invention in FIG. 1, an instruction sequence to be executed when branching occurs and the length of the instruction sequence are respectively prestored in the transient queue registers 4 and the length register 5.

Figure 2:
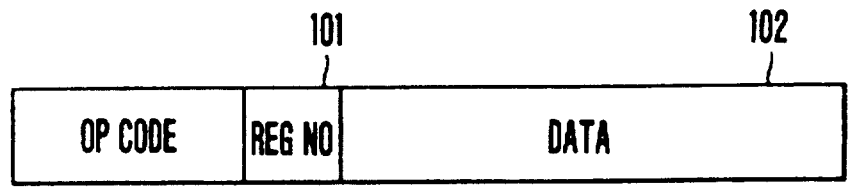
FIGS. 2 and 3 are views showing the formats of store instructions for operating the system in FIG. 1.
Figure 3:
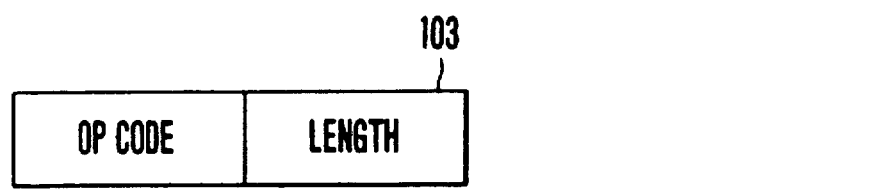

FIGS. 2 and 3 show instruction formats which are executed in the execution control unit 19 so as to store the instruction sequence and the length of the instruction sequence in the transient queue registers 4 and the length register 5 in advance.

When an instruction shown in FIG. 2 is executed, one of the terminals SET (connected to the lines 11) of the execution control unit 19 which is designated by the number of a field 101 is set at logic "1", and at the same time, the data of a field 102 is output through the internal bus IDB. As a result, the data of the field 102 is stored in the transient queue register 4 designated by the field 101.

When an instruction shown in FIG. 3 is executed in the execution control unit 19, a set signal 12 of the length register 5 is set at logic "1", and the contents of a field 103, i.e., the length of the instruction sequence, are output to the internal data bus IDB. As a result, the length of the instruction sequence is stored in the length register 5. Note that the length register 5 is reset when the power source is turned on.

When a branch instruction is generated, the circuit shown in FIG. 1 is operated in the following manner.

When the branch instruction is generated, the FLSH signal 9 is set at logic "1", the value of the length counter 5 is set in the counter 6, and the counter 7 is cleared. The selectors 2 for selecting input data to the queue registers 1 select outputs from the corresponding transient queue registers 4. The FLSH signal 9 serves as a set signal to the queue registers 1, and the contents of all the transient queue registers 4 are stored in the queue registers 1.

This operation produces the same effect as storing the contents of the transient queue registers 4 in the queue registers 1 by a length designated in the length register 5, and hence these instructions are executed prior to arrival of the instruction at the destination of the branch.

Figure 4:
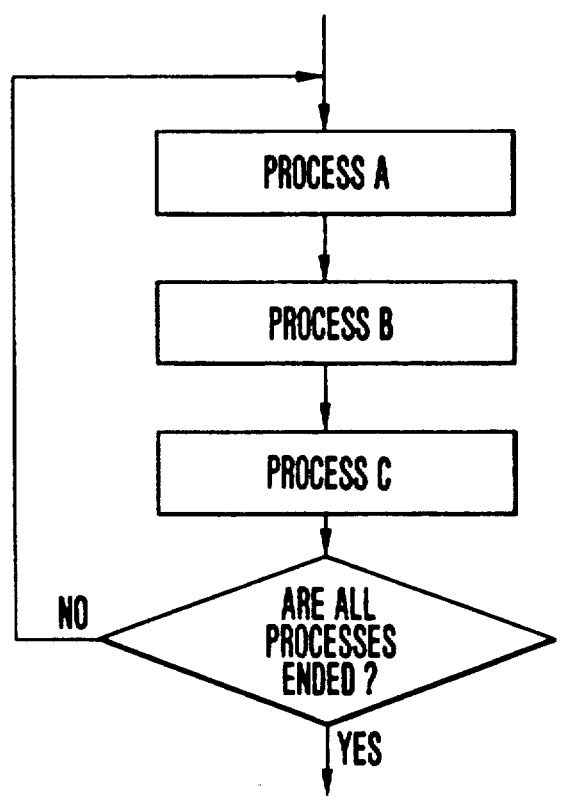
FIG. 4 is a flow chart showing an example of processing in a prior art.
Figure 5:
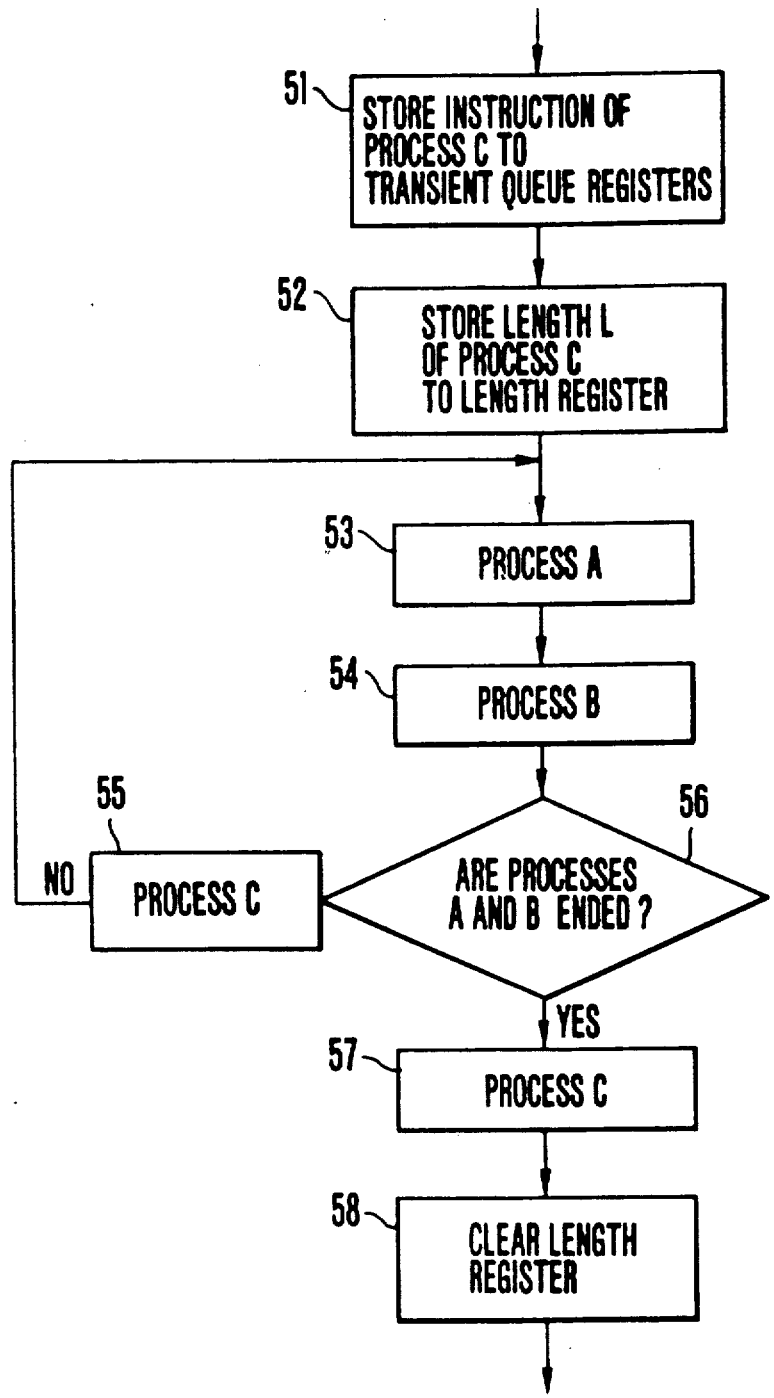
FIG. 5 is a flow chart for explaining an operation of the system in FIG. 1.

FIG. 4 is a flow chart showing an operation of a conventional computer without using the present invention. FIG. 5 is a flow chart showing a case wherein an operation equivalent to the operation in FIG. 4 is performed by the computer according to the embodiment of the present invention.

In steps 51 and 52 in FIG. 5, the instruction sequence of a process C and its length are respectively stored in the transient queue registers 4 and the length register 5. In steps 53 and 54, processes A and B are executed. When the flow returns to the process A in branch step 56, the instructions of process C set in the transient queue registers 4 are executed in step 55, as described above. The process C is performed by utilizing the vacant time, i.e., while the instructions of the process A are supplied to the prefetching queue upon every jump to the process A. After step 56, the remaining instructions of the process C are performed. In step 58, the length register 5 is cleared and the process is ended.

As is apparent from the comparison between the flow charts in FIGS. 5 and 4, since the process C is performed until the instruction at the destination of jump arrives, the instructions in the loop are decreased by one step in FIG. 5, and hence the processing speed becomes higher than that in FIG. 4.

Figure 6:
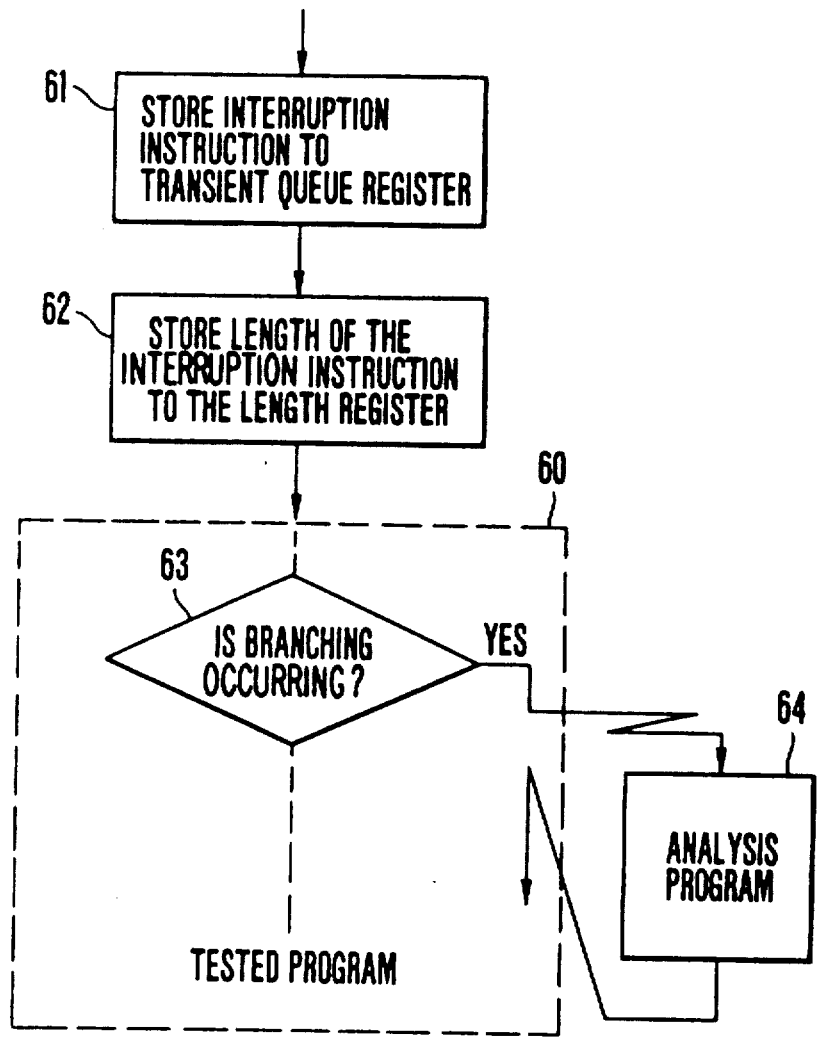
FIG. 6 is a flow chart showing an example of processing in the present invention.

FIG. 6 shows a case wherein a program test is performed by using the prefetching queue control system of the present invention.

Referring to FIG. 6, reference symbol 60 is a tested program including a branch 63.

In steps 61 and 62, an interruption instruction and its length are prestored in the transient queue registers 4 and the length register 5 shown in FIG. 1, respectively. The interruption instruction is executed and an analysis program 64 is called in accordance with the above operation every time the branch 63 occurs in the tested program 60.

That is, the operation of the tested program 60 can be variously analyzed without changing the program 60.

As has been described above, according to the present invention, a preset instruction is transferred to the prefetching queue when a branch instruction is generated so that the preset instruction can be executed prior to execution of an instruction at a destination of the branch, thereby eliminating vacant time in which execution of an instruction is temporarily stopped when branching occurs.

What is claimed is:

1. A prefetching queue control system for controlling an operation of prefetching in a computer in which parallel to execution of a current instruction, a subsequent instruction is prefetched, comprising:

a buffer memory including a plurality of first registers each for storing an instruction in response to a first set signal;

means for generating said first set signal;

a decoding unit for selecting and decoding an output from one of said plurality of first registers of said buffer memory;

a bus unit, connected to a main memory through address and data buses, for outputting through a prefetching bus an instruction prefetched from said main memory;

first memory means, including a plurality of second registers of a number equal to at most the number of said first registers, for prestoring an instruction sequence which is to be executed by utilizing a time interval before an instruction at a destination of a branch is supplied from said main memory in response to a branch instruction;

second memory means for prestoring length data of said instruction sequence prestored in said first memory means;

selection means, controlled by a control signal, for selecting either said instruction supplied through said prefetching bus or an output from said first memory means and outputting selected data to said buffer memory; and an execution control unit for controlling prestoring operations of said first and second memory means respectively to prestore said instruction sequence and said length data, for controlling execution of an instruction output from said decoding unit, for generating said control signal when branching occurs, and for controlling said first set signal generating means, said selection means, and said decoding means to transfer said instruction sequence stored in said first memory means to said buffer memory as a transferred instruction sequence in accordance with said length data stored in said second memory means, to sequentially receive said transferred instruction sequence through said decoding means, and to execute said transferred instruction sequence for a time interval before the instruction at said destination of said branch is supplied.

2. A system according to claim 1, wherein said first set signal generating means includes a counter whose count value is replaced with contents of said second memory means by the control signal, and a gate circuit for generating a first set signal on the basis of said count value of said counter and said control signal.

* * * * *